(12) United States Patent
Hayes et al.

(10) Patent No.: US 7,011,749 B2
(45) Date of Patent: Mar. 14, 2006

(54) REMEDIATION WITH OZONE OF SEDIMENTS CONTAINING ORGANIC CONTAMINANTS

(75) Inventors: Donald F. Hayes, Sandy, UT (US); Puikwan A. Hong, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 0 days.

(21) Appl. No.: 10/923,364

(22) Filed: Aug. 20, 2004

(65) Prior Publication Data

US 2005/0087499 A1    Apr. 28, 2005

Related U.S. Application Data

(63) Continuation of application No. PCT/US03/05296, filed on Feb. 21, 2003.

(60) Provisional application No. 60/358,920, filed on Feb. 22, 2002.

(51) Int. Cl.
*C02F 11/14*    (2006.01)

(52) U.S. Cl. .................. 210/170; 37/307; 37/314; 37/342; 210/199; 210/205; 210/242.1; 210/909

(58) Field of Classification Search ................ 210/747, 210/748, 760, 170, 198.1, 199, 205, 206, 210/241, 242.1, 251; 134/25.1; 37/307, 37/314, 342, 195; 405/128.5, 128.75
See application file for complete search history.

(56) References Cited

U.S. PATENT DOCUMENTS

| | | | | |
|---|---|---|---|---|
| 3,470,091 | A * | 9/1969 | Budd et al. | 261/36.1 |
| 5,695,635 | A * | 12/1997 | Sasaki et al. | 210/188 |
| 5,753,494 | A * | 5/1998 | Hater et al. | 435/262.5 |
| 5,849,201 | A * | 12/1998 | Bradley | 210/752 |
| 6,312,605 | B1 * | 11/2001 | Kerfoot | 210/741 |
| 6,319,328 | B1 * | 11/2001 | Greenberg et al. | 134/2 |

* cited by examiner

*Primary Examiner*—Peter A. Hruskoci
(74) *Attorney, Agent, or Firm*—TraskBritt

(57) ABSTRACT

A system for treating sediments contaminated with organic contaminants, such as polychlorinated biphenyls (PCBs) and other contaminants polyaromatic hydrocarbons (PAHs) and dichlorodiphenyltrichloroethane (DDT) includes treating the sediments with ozone to react the contaminants. The system is particularly effective for remediation of PCBs. In an in-situ system for remediating sediments in underwater sediment beds that are contaminated with (PCBs) and other contaminants, the contaminated sediments are treated with ozone with an ozonator conveyed over the sediment bed to mix the sediment with the ozone. The ozone reacts with the PCBs to form more reactive and biodegradable products. The treated sediment is then redeposited upon the sediment bed.

9 Claims, 7 Drawing Sheets

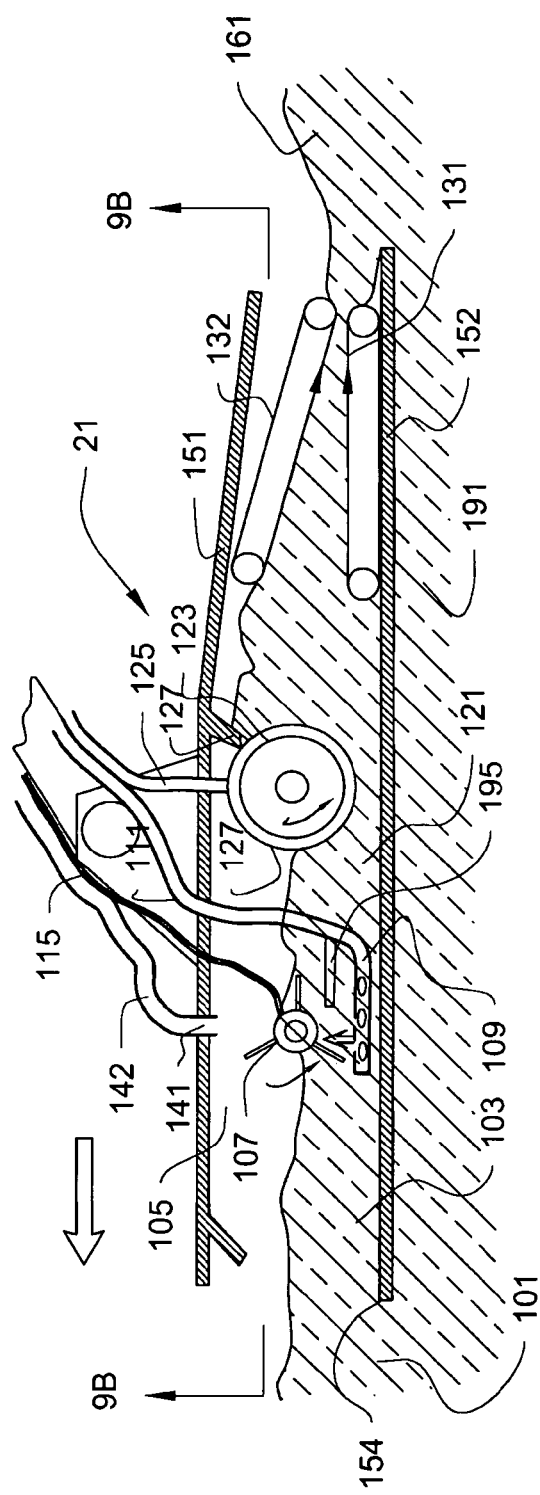
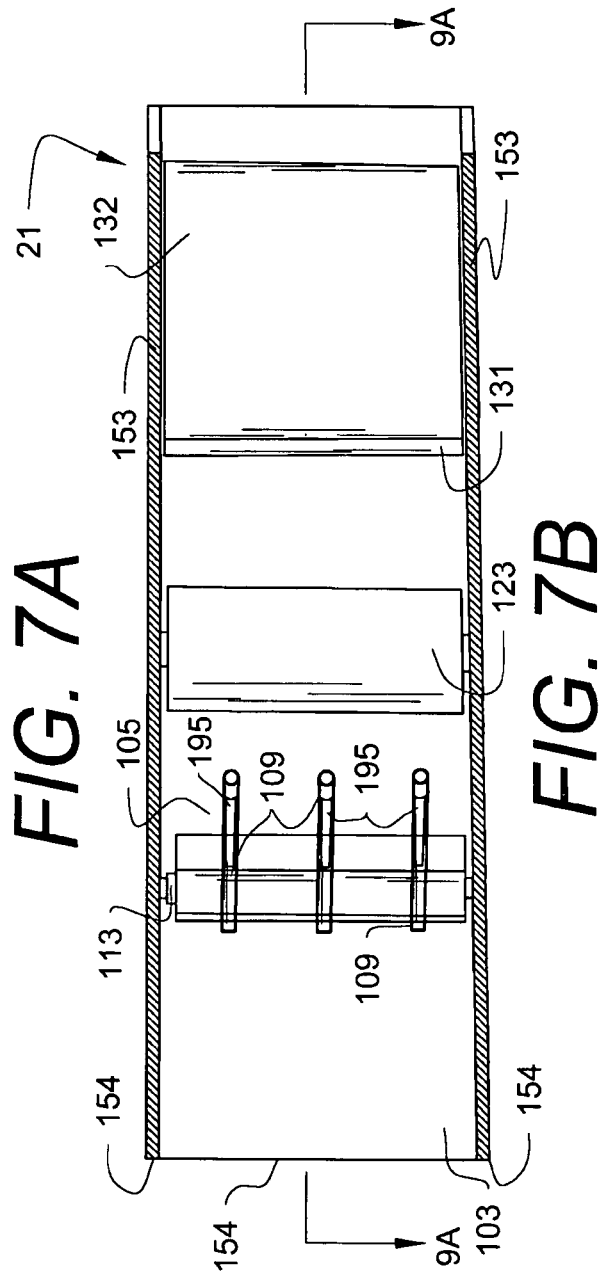
FIG. 7A
FIG. 7B

REMEDIATION WITH OZONE OF SEDIMENTS CONTAINING ORGANIC CONTAMINANTS

CROSS-REFERENCE TO RELATED APPLICATIONS

This application is a continuation of co-pending PCT application PCT/US03/05296, filed Feb. 21, 2003, designating the United States of America, and published in English as WO 2003/072506 A2 on Sep. 4, 2003, which application claims priority from U.S. Provisional Patent Application 60/358,920, filed Feb. 22, 2002.

TECHNICAL FIELD

This invention relates to remediation of underwater sediments contaminated with contaminants such as polychlorinated biphenyls, and polyaromatic hydrocarbons (PAH).

BACKGROUND

Polychlorinated biphenyls (PCBs) are persistent and environmentally hazardous compounds that occur in many soils and sediments as a result of past industrial activity. PCBs are typically mixtures of isomers of trichlorobiphenyl, tetrachlorobiphenyl, pentachlorobiphenyl, dichlorobiphenyl and hexachlorobiphenyl, but may contain other polychlorobiphenyls. Up until the early 1970's PCBs were used in a wide range of applications due to their unique blend of fire resistance, thermal and oxidative stability, electrical characteristics, solvency, inertness and liquid range. Among their most important uses were as a dielectric medium in transformers, either alone or in blends with other materials such as trichlorobenzene; as the dielectric impregnating medium in capacitors; as plasticizers; as ingredients in lacquers, paints and varnishes and adhesives; as water proofing compounds in various types of coatings; as lubricants or lubricant additives under extreme conditions; as heat transfer fluids; as fire resistant hydraulic fluids; as vacuum pump fluids; and as air compressor lubricants. Their largest application was in the electrical industry as a dielectric medium in transformers and capacitors.

However, in the late '60's and early '70's, it was discovered that PCBs have a major potential for environmental contamination due to their extremely slow biodegradation rates. The persistence and toxicity of PCBs have prompted governmental action restricting their use and application. The current laws and regulations contain provisions for discontinuance of their use and for their eventual disposal.

Even trace amounts of PCBs are considered undesirable. Notwithstanding their chemical inertness PCB compounds have been found to or been suspected of being a carcinogen, a development toxicant, gastrointestinal or liver toxicant, a neurotoxicant, and reproductive toxicant, and respiratory toxicant, and a skin or sense organ toxicant. PCBs rank among the more hazardous chemicals, for even in small amount, PCBs displays toxicity to both humans and wildlife.

Large deposits of PCB contaminated soils and sediment remain in many areas of the country. These deposits continue to release PCBs into the environment. Of special concern are PCB contaminated sediment deposits at the bottom of water bodies such as rivers, rivers, lakes and waterways. These sediments, even those containing only low concentrations of PCBs, pose human health and ecological risks from low-level food chain interactions and impair water quality due to the release PCBs into the water column. Sport and commercial fisheries on many water bodies have closed due to fishing restrictions associated with PCB contamination in fish. The problem is vast. Numerous Superfund sites involve PCB contaminated sediments. Some of the most well known include the Hudson River, the Passaic River, the New Bedford Harbor, and the Fox River. The size of some of these sites is almost overwhelming; nearly 200 miles of the Hudson River is a designated Superfund site and the Fox River in the State of Wisconsin contains over 10 million cubic yards of PCB contaminated sediments in over 40 miles of riverbed. The problem extends well beyond the Great Lakes and its tributaries, however. PCB contaminated sediment sites exist in all areas of the US and are especially prevalent in coastal areas.

Currently methods used to remediate PCB-contaminated sediments can be classed in two basic groups, (1) removal and treatment of the sediments, and (2) capping. Removal and treatment typically involves dredging the sediments and transporting them to a remote site where the sediments and associated carrier water are treated by some physical or chemical process to reduce the PCB concentration or bind the PCBs permanently with the sediment particles. Although several PCB treatment methods have been developed and pilot-tested, for example, incineration, solvent extraction, and vitrification, none have been implemented in a full-scale remedial effort. These methods face a multitude of problems, but logistics, costs, and disposal of residuals are the most difficult to solve. For a site like the Fox River and Hudson River, remediation by removal and treatment (currently planned in both cases) may cost billions of dollars just for rudimentary treatments involving only removal of the contaminated sediments, without consideration of the additional costs and problems associated with of the transportation, treatment, and final disposal of sediment. Thus, most PCB-contaminated sediment projects that have proceeded involving significant quantities of sediment are those in which physical separation was deemed an adequate treatment and the PCB-contaminated sediments were to be buried in either an upland or in-water disposal facility. However, the dredging process itself can be very disruptive to the ecology, and creates a disposal problem for the large volume of treated sediments.

Capping involves depositing stable materials, such as gravel or sand, on top of contaminated sediment. The intention is to isolate the PCB-contaminated sediment from overlying water and thereby prevent PCB migration into the water. While effective in some environments, there are places where this method cannot be applied, due to the currents, hydrology and other factors. In addition, capping is often not desirable because it can radically and permanently alter the ecology of the riverbed. This method is also costly, involving material costs, transportation costs, and the cost for laying the material in the riverbed. Capping is also often viewed as only an interim solution since the PCBs are still in place under the capping layer. Another problem with both removal and capping systems is that, during removal or capping, PCB-laden sediment may be suspended in the water, amplifying the toxic and environmental hazards and increasing the turbidity of the water.

In-situ methods have been used for remediating contaminant-containing soils on land-based sites, which involve surface treatment or well injection with chemicals, bacterial inoculants and gases. However, these methods are not adaptable and are not practical for underwater sediments for many reasons. Accordingly, it is believed that there are no known in-situ methods that are used for remediating underwater sediments on a commercial scale.

An in-situ method has been proposed and tested on a pilot scale at sites in Hamilton Harbour, Ontario. In this method underwater sediments are treated with nutrients to accelerate biodegradation. It has been proposed for the reduction of PAHs, BTXs, TPHs and petroleum hydrocarbons (volatile organics). The method involves an underwater harrow towed behind a boat to till the contaminated sediment and inject it with a chemical oxidant, usually calcium nitrate. Since calcium nitrate is also a nutrient, it must be injected deep into the sediment to prevent it from escaping into the water column and boosting the growth of algae. The harrow is attached to and dragged behind a boat or barge, and includes a series of nozzles, tines and injections ports. Chemicals injected include the oxidants to oxidize any sulphides (which are toxic to bacteria) into non-toxic sulphates and nutrients (phosphorous, nitrogen, carbon) to encourage bacterial proliferation and activity. A flocculating agent is also added along with the chemical as a control for sediment re-suspension as the chemicals are injected.

However, this method by its harrowing of the sediment has the potential of creating a large quantity of suspended silt capable of releasing hazardous chemicals. In addition, PCBs are biologically degraded very slowly even with supplemental nutrients, thus biodegradation cannot be relied upon practically as a sole remediation technique. Possibly for these and other implementation problems, there are no known applications outside of the pilot testing. In summary, this method has only limited applicability and is not applicable to PCBs. In addition, it can contaminate the water body through release of the reagents to the water, and has inherent turbidity and silt suspension problems.

BRIEF SUMMARY OF THE INVENTION

The present invention relates to the removal of polychlorinated biphenyls (PCBs) and other contaminants from underwater sediments and the detoxification of these sediments by in-situ degradation of the contaminants, particularly the PCBs, into environmentally and toxicologically harmless compounds.

An aspect of the invention is the treatment with ozone of sediments containing PCBs and other contaminants to degrade by chemical reaction these contaminants to more chemically and biologically reactive and/or less harmful products.

The sediment after ozone treatment is depleted of the difficult-to-remove contaminants, such as PCBs. The remaining products are more reactive and more susceptible to biodegradation. Accordingly, the sediments are preferably treated after the ozone reaction by any suitable technique to improve the biodegradation conditions and to promote the onset of biodegradation of the products.

The present invention is particularly advantageous in treatment of PCB containing sediments, since there is currently no available commercially viable system for in-situ treatment of PCB-containing sediments. However, the present invention is also applicable for the removal of other contaminants, such as, for example, chlorinated hydrocarbons and polyaromatic hydrocarbons (PAHs), including dichlorodiphenyltrichloroethane (DDT).

The treatment of sediments with ozone is adaptable to an in-situ method, and is preferably applied using in-situ system as described below. However, it is within contemplation of the invention to use as an ex-situ ozone treatment application.

An aspect of the invention is a method and apparatus of the invention that involves the in-situ treatment of the sediments with ozone. The treatment is made in a manner that reacts the PCBs and other contaminants in the sediment with the ozone to produce more reactive and less harmful products. The treatment is contained to control turbidity by reducing the liberation of suspended sediments into the water. After treatment, the PCB depleted sediment is redeposited and consolidated in a manner so that the treated sediment bed resembles an untreated bed, but a bed depleted of PCB contaminants, and in a condition that is well on its way to recovery from the reaction products by natural biodegradation.

The term "sediment" includes nonsolid or non-consolidated deposits of solid fragments or particles of material that usually come from the weathering of rock and are carried and deposited by wind, water, or ice. Basically, any such deposit of materials that are contaminated can be treated with the ozone degradation system of the invention. While the present invention is particularly advantageous for the in-situ treatment of underwater sediments, other media types are contemplated, including sediments treated ex-situ, and sediments treated in-situ on land areas. There is no limitation as to their source, e.g., underwater sediments, land "sediments" or soils that may be surface, underground, and below or above the water table.

The contaminants in sediments, including PCBs, are often hydrophobic and may require a mixing system to sufficiently contact the contaminants with the zone so that they sufficiently react with the ozone. Any suitable mixing or contacting system is suitable, including, for example, mechanical stirrers paddles, ultrasound, or pressurized fluid injection.

BRIEF DESCRIPTION OF THE DRAWINGS

FIGS. 7A and 7B are respective cross-sectional schematics of a side view and a top view of another exemplary ozonator of the invention for in-situ of treatment of sediments with ozone.

DETAILED DESCRIPTION OF THE INVENTION

The present invention involves at least two aspects, (1) the reaction of sediments containing PCBs and/or other contaminants with ozone, and (2) an in-situ method and apparatus for treating sediments containing PCBs and other contaminants with ozone.

Treatment of PCB Sediment with Ozone

Figure 1:
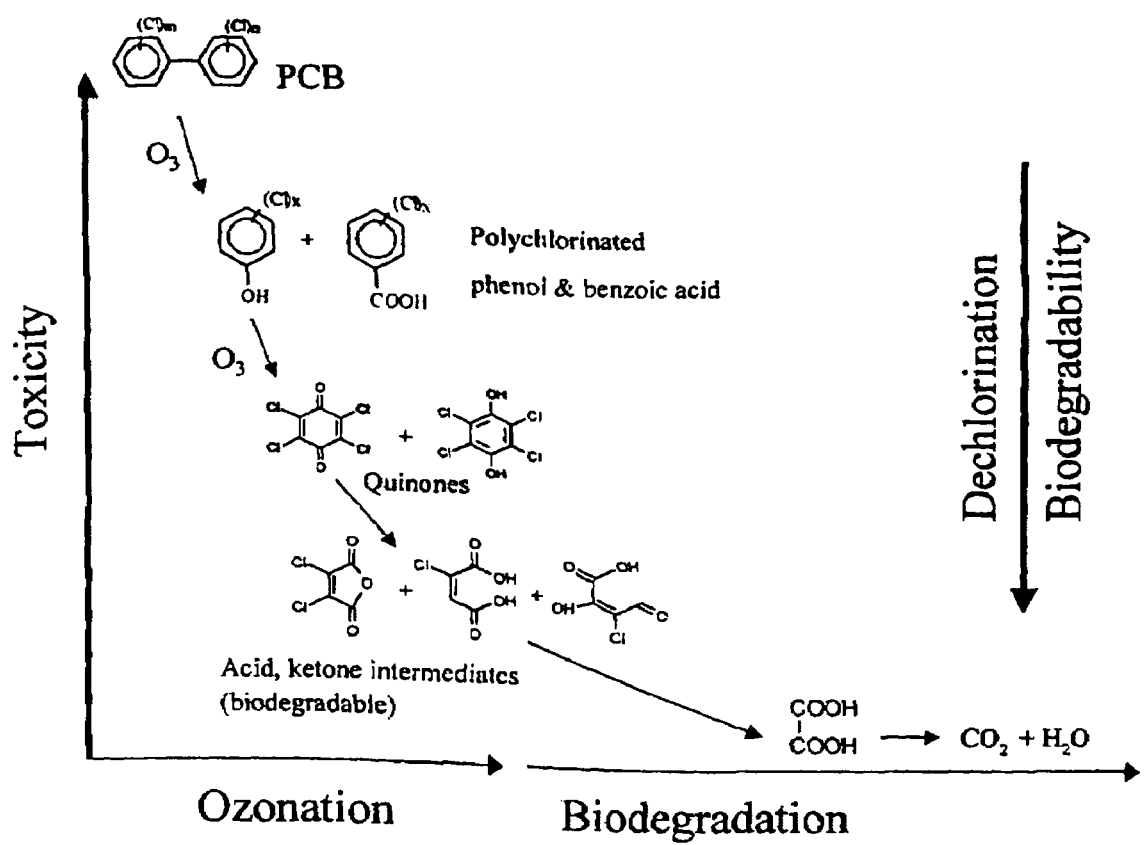
FIG. 1 is diagram of one possible reaction pathway, showing degradation of PCBs to non-toxic compounds and elements.

Reference is now made to FIG. 1, which shows what is believed to be a likely or plausible reaction path for reaction of PCBs with ozone. As proposed, the PCBs are reacted with ozone ($O_3$) to form polychlorinated phenols (PCP) and polychlorinated benzoic acids (BA), which will undergo further degradation. The degradation pathway of PCP under ozonation has been documented in P. K. Andrew Hong, Yu Zen, "Degradation of pentachlorophenol by ozonation and biodegradability of intermediates," Water Research, Vol. 36, pp. 4243–4254, 2002. PCP and BA further react with the ozone to produce quinones. Quinones further react with the ozone to produce acid and ketone intermediates, which are known to be biodegradable to low molecular-weight dicarboxylic acids and ultimately to carbon dioxide and water. In summary, PCBs react with ozone to eventually form acid and ketone intermediates that are readily biodegraded. The chlorine atoms in the organic molecules are liberated as inert chloride ions during the ozonation.

The scheme in FIG. 1 is believed to possibly be the predominant degradation reaction of PCB and ozone. Other reactions may occur and be dominant, but it is believed that in any reaction patch that any products produced thereby are further oxidized and dechlorinated by the ozone into readily into chemical forms that are much less toxic and more biodegradable. In any event, any toxic consequences of these materials are believed to be much more temporary and less significant than those of the PCBs. Any gases that are produced can be suitably vented, and treated if required, by suitable techniques. The main purpose of this figure is to illustrate increasing biodegradability (decreasing recalcitrance) with increasing contact time with zone.

EXAMPLE

PCB Reaction with Ozone

One of the problems in the prior-art is that degradation of PCBs, which generally involved biodegradation systems, is too slow to be practical and applicable to an economical technique. The present invention involves a chemical reaction of PCBs to produce products that are less harmful and more amenable to biodegradation. Accordingly, the following example demonstrates that reaction of PCBs with ozone is not only possible, but represents a viable and economical technique for the treatment of PCB laden sediments.

This particular example shows that PCB in an aqueous environment undergoes degradation when exposed to ozone. Vigorous mixing enhanced the contacting of the PCB and ozone. The vigorous mixing in the examples was provided by ultrasound irradiation, but other methods of mixing are also applicable.

Methods

Chemicals

Ozone (~1% w/w ozone in air) was generated from filtered, dry air by an ozonator (Model T-816, Polymetrics Corp.). Arochlor™ 1242 PCB and Arochlor 1254 PCB were purchased form Aldrich Chemical Company. Stock and working indigo blue solutions were prepared from potassium indigo trisulfonate ($C_{16}H_7N_2O_{11}S_3K_3$, Aldrich Co.) per Standard Methods. Low-organic (<15 ppb as TOC), low-ion (resistivity>18 MΩ-cm), and non-pyrogenic (up to 4-log reduction with reverse osmosis pretreatment) distilled-deionized water was used in all procedures (4-stage Mill-Q Plus system, Millipore Co.). Hexane, acetone, trichloromethane, and methanol of HPLC grade were used in extraction and other experimental procedures. Other chemicals used in this research were of reagent grade.

Analytical Methods and Equipment

Aqueous concentration of ozone in the reactor was determined according to the Indigo Blue method (Standard Methods) with the HP-8452 spectrophotometer (Hewlett Packard Co.). Typically, a 5-mL sample was withdrawn from the reactor and added to 95 mL of distilled-deionized water. 90 mL of this mixture was added with 10 mL of the Indigo reagent II. The absorbance of the solution was measured at 600 nm with a HP 8452 spectrophotometer. The aqueous ozone concentration was thus determined according to the following formula:

$$O_3 \text{ mg/L} = \frac{100 \times \Delta A}{f \times b \times V}$$

Where,
ΔA=different in absorbance between sample and blank
b=path length of cell, cm (1 cm)
V=volume of sample, mL (90 mL)
F=0.42

The actual ozone concentration was obtained by multiplying with a dilution factor of 20.

Chloride

Inorganic chloride ion was formed during reaction and determined directly with an ion chromatograph (IC) (DIONEX 500) equipped with a conductivity detector. A 4-mm column (Ionpac AS4A-SC) coupled with a guard column (Ionpac AG4A-SC) was used. The eluent containing 1.8 mM $Na_2CO_3$ and 1.7 mM $NaHCO_3$ was used at a flowrate of 2 mL/minute.

Quantification of Organics

Extracted samples containing PCBs, intermediates, and byproducts were analyzed using a gas chromatograph (GC) (HP 5890, Hewlett Packard Co.) equipped with a capillary column (HP-5MS non-polar column, 30 m×0.25 mm×0.25 μm, Hewlett-Packard Co.) and electron capture detector (ECD) The GC was interfaced and programmed with the HP Chemstation software (Hewlett-Packard Co.). A splitless injection was used with the oven temperature programmed from 80° C. (2 minutes) to 200° C., at a ramp rate of 30° C./minute; from 200° C. to 300° C., at a ramp rate of 10° C./minute; then 300° C. for 5 minutes. Injection temperature and detector temperatures were 250° C. and 330° C., respectively. Nitrogen was used as the make-up gas at 40 psi, and helium as the carrier gas at 22.4 psi.

Reactor and Procedures

A single-neck round-bottom flask (250 mL), or a jacketed glass reactor (500 mL) was used the reaction vessel (ACE glass Inc.). Mixing of this reactor was provided by a mechanical stir bar, or a motor-driven mechanical stir (ACE glass Inc.), or via ultrasound. Ozone gas was bubbled into the reactor near the bottom through a glass dispersion tube (ACE glass Inc.) Constant pH during reaction was maintained at desired levels by automatic addition of concentrated NaOH (0.1 M) solution delivered by a peristaltic pump controlled by a pH probe/meter. Typically, 2 mg of the Arochlor compounds (Aldrich) in hexane solution was added to the reactor equipped with a temperature control jacket (25° C.±1), automatic pH control (pH maintained at 7.5), and ultrasound probe for agitation. After hexane evaporated, 200 mL of deionized water (18 MΩ-cm) was added to the PCB residue and ozone introduced. After 1 hour of ozonation, the reactor and its aqueous content were extracted twice with hexane (total 100 mL) and subsequently with acetone (10 mL), and the combined solvents were solvent-exchanged to hexane, dried by sodium sulfate, then analyzed by GC-ECD.

For experiments with sediment, about 7.5 g of PCB-contaminated sediment (45% dry solid; from a Wisconsin site) was placed in a round-bottle flask and added with 100 mL of deionized water. The sediment sample came from 12 petite ponar grabs from the Wisconsin site, for which historical PCB analyses on core samples were in the 20–50 ppm range. The r-b flask was immersed in a small ultrasound cleaning tank (60-Watt) and the mixture was ozonated for 2 hours. The solid was separated by filtration through a 0.45-$\mu$m glass filter, and soxhlet-extracted with 200 mL hexane-acetone (1:1) for 24 hours. The extract was concentrated and later solvent-exchanged into hexane, dried by sodium sulfate, and analyzed by GC-ECD.

Agitation of the reaction mixture was, when specified, aided by immersing an ultrasound probe (model VCX 600-5, ACE Glass) capable of delivering 20 KHz at up to 600 Watts, or alternatively by immersing the reactor into an ultrasound cleaning tank (Model 1210R-DTH, Branson Ultrasonics Corp.) at 60-Watts output. Degradation did not depend significantly on ultrasound, or the intensity of ultrasound; it was intended as a means of providing vigorous mixing for the dispersed PCB and not as a means of degradation.

Results

Figure 2:
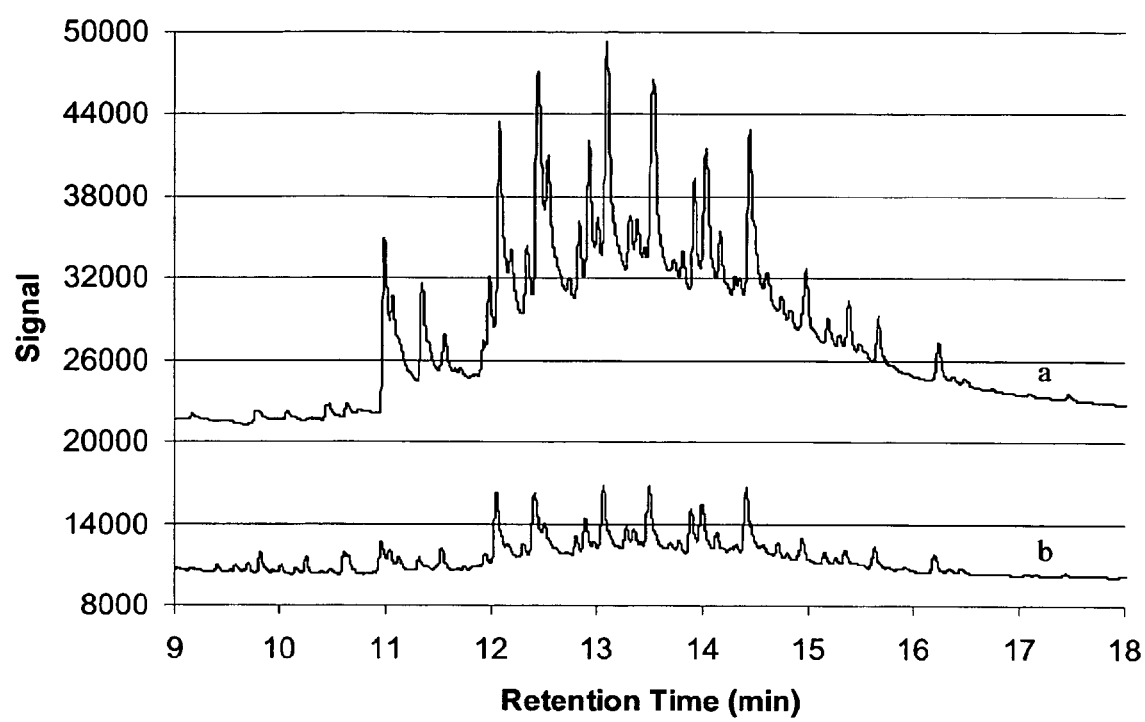
FIG. 2 is a graph showing gas chromatograms of a PCB (Arochlor™ 1254) in chloroform before (a) ozonation, and (b) after 1 hour of ozonation (85–100% degradation.
Figure 3:
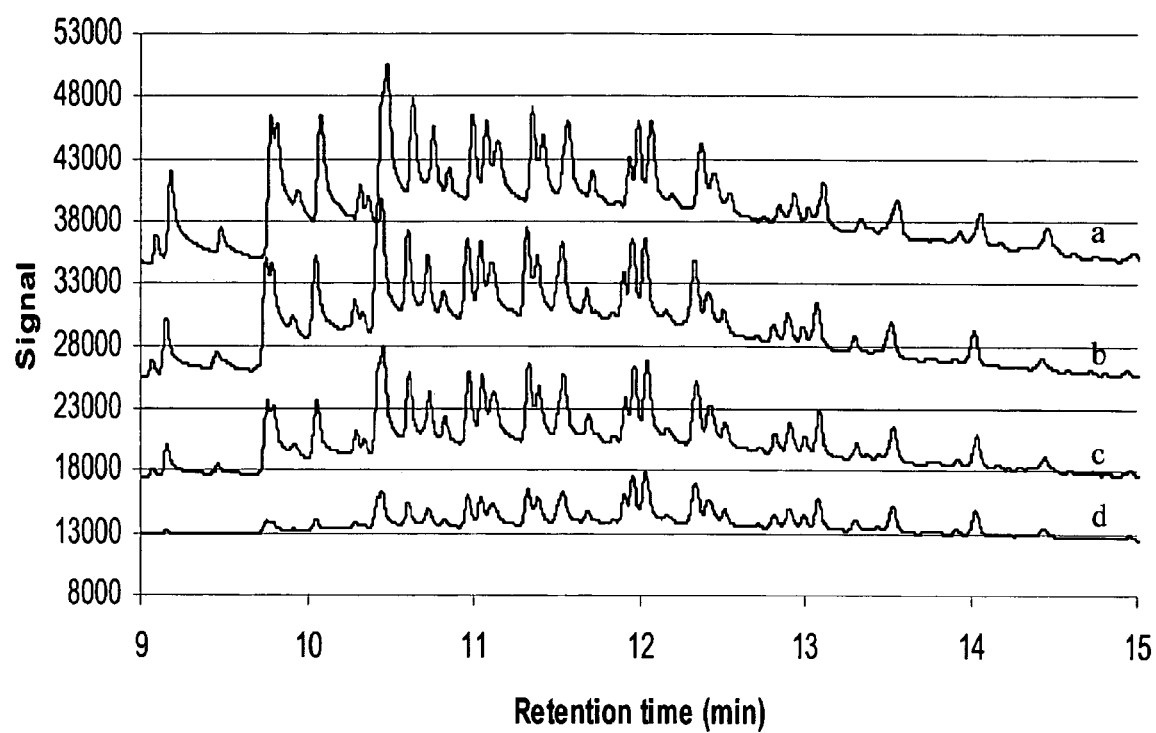
FIG. 3 is a graph showing gas chromatograms of Arochlor 1242 with various treatments (a) before treatment, (b) after 1 hour of aeration (c) after 1 hour of aeration with ultrasound, and (d) after 1 hour of ozonation with ultrasound. The baselines are offset for comparison.
Figure 4:
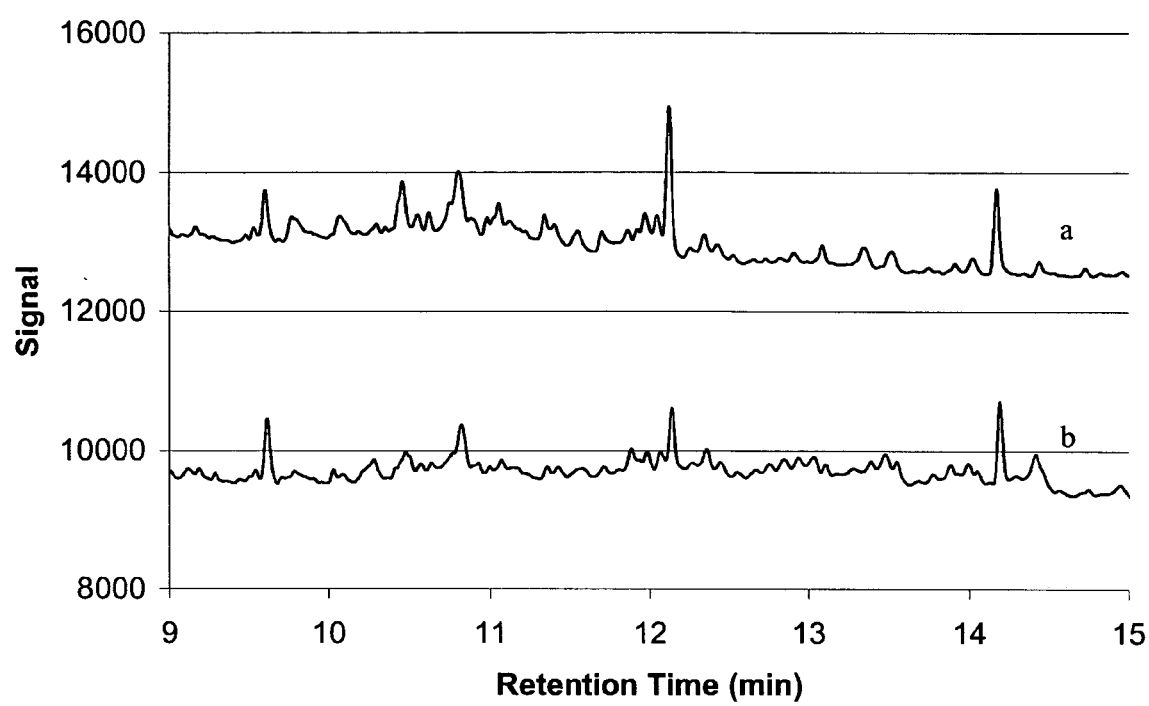
FIG. 4 is a graph showing gas chromatograms of extracted organics in a PCB-contaminated sediment sample after (a) 2 hours of aeration, and (b) 2 hours of ozonation with ultrasound agitation showing 45–82% degradation based on 8 signals at retention times resembling those of Arochlor 1242.

Key results that validate the treatment approach are shown in Table 1, and FIG. 2, FIG. 3 and FIG. 4. FIG. 2 is a graph showing gas chromatograms of Arochlor 1254 in chloroform before (a) ozonation, and (b) after 1 hour of ozonation (85–100% degradation). The baselines are offset for comparison. FIG. 3 is a graph showing gas chromatograms of Arochlor 1242 with various treatments (a) before treatment, (b) after 1 hour of aeration (showing no degradation) (c) after 1 hour of aeration with ultrasound (showing no degradation), and (d) after 1 hour of ozonation with ultrasound (showing 72 to 98% degradation). The baselines are offset for comparison. FIG. 4 is a graph showing gas chromatograms of extracted organics in a PCB-contaminated sediment sample after (a) 2 hours of aeration, and (b) 2 hours of ozonation with ultrasound agitation showing 45–82% degradation based on 8 signals at retention times resembling those of Arochlor 1242.

The main conclusions include:

1. Between 85–100% of PCB (Arochlors 1242 & 1254) in chloroform solution was degraded within 1 hour of ozonation. No removal of PCB was observed for prolonged duration when air was used in place of ozone. Thus, ozone is useful for PCB removal.

2. About 70–90% degradation of PCB (Arochlor 1242) was achieved within 1 hour of ozonation and ultrasound-aided mixing. To ascertain the effect of ozone, the level of PCB degradation was compared with controls with no treatment, treatment with air, and treatment with air and ultrasound.

Experimental synopsis. 2 mg of Arochlor 1242 (Aldrich) in hexane solution was added to the reactor equipped with a temperature control jacket (25° C.±1), automatic pH control (pH maintained at 7.5), and ultrasound probe for agitation. After hexane evaporated, 200 mL of deionized water (18 MΩ-cm) was added to the PCB residue and ozone introduced. After 1 hour of ozonation, the reactor and its aqueous content were extracted twice with hexane (total 100 mL) and subsequently with acetone (10 mL), and the combined solvents were solvent-exchanged to hexane, dried by sodium sulfate, then analyzed by GC-ECD.

3. Between 40–80% reduction of extractable organics from a PCB-contaminated sediment was achieved by 2 hours of ozonation of the sediment. This conclusion was made by comparison of results to experimental controls using air in place of ozone. It is believed that further GC/MS analysis will lead to identification and reduction of PCB congeners within the extractable organics. Further, comparisons of GC retention times with PCB standards have revealed strong resemblance to Arochlor 1242 that is also consistent with historical concentration data at the site.

Experimental synopsis. About 7.5 g of PCB-contaminated sediment (45% dry solid) from a Wisconsin site was placed in a round-bottle flask and added with 100 mL of deionized water. The sediment sample came from 12 petite ponar grabs from the Wisconsin site, for which historical PCB analyses on core samples were in the 20–50 ppm range. The r-b flask was immersed in a small ultrasound cleaning tank (60-Watt) and the mixture was ozonated for 2 hours. The solid was separated by filtration through a 0.45-$\mu$m glass filter, and soxhlet-extracted with 200 mL hexane-acetone (1:1) for 24 hours. The extract was concentrated and solvent-exchanged into hexane, dried by sodium sulfate, and analyzed by GC-ECD.

Experimental results were also obtained under various conditions, including different Arochlors, ozonation times, pHs, agitation with and without the use of an ultrasound cleaning tank (60-Watts) or ultrasound probe (variable up to 600-Watts), the use of cosolvents. Table 1 summarizes the degradation results under these conditions.

It should be noted that Arochlors contain a large number of congeners. The congeners were removed by ozone with different kinetic rates. Thus, a range of degradation levels was determined for the Arochlor, and it was determined using retention times of 11 or 12 congeners that exhibited the strongest GC signals.

It should be further noted that similarly GC signals from the strongest 6 GC signals that coincide with the retention times of Arochlor 1242 were used for determination of degradation levels for the Lower Fox River sediment sample. It is believed that Arochlor 1242 may have been the main contributor to the sediment.

The results suggest that ozone is capable of removing PCBs under different conditions.

The reagent Arochlor 1242 and others are a dense, hydrophobic liquid. As liquid dollops immersed in water, PCB has very limited surface area exposed to water and thus is highly inaccessible to dissolved ozone in the aqueous phase. To promote dispersion and contact of PCB with aqueous ozone, ultrasound was introduced to enhance mixing. This resulted in higher degradation levels.

Control experiments show that ultrasound itself (with air in place of ozone) was ineffective or negligible for PCB degradation other than enhanced mixing; but at intense ultrasound irradiation (e.g., up to 600-Watt) it contributed to a moderate level (up to 20%) of PCB degradation. In remediation application, low-intensity ultrasound is expected to provide enhanced mixing and better contact of ozone with sediment PCB. It can be incorporated into the ISO device, but it would not be relied upon as a means of PCB degradation.

Conclusions

Based on results obtained, the following can be concluded:

a. Ozonation of Arochlors 1242 and 1254 dissolved in chloroform resulted in 90–100% and 85–100% removal, respectively, of all the congeners within 1 hour. This showed that, without the aid of ultrasound, the PCB molecule was reactive with ozone and subject to degradation by ozone.

b. Ozonation of PCB under vigorous agitation in aqueous environment resulted in various levels of PCB degradation depending primarily on contact time, degree of agitation, and pH. The reduced removal was due to limited exposure of PCB droplets to aqueous ozone.

c. Degradation of PCB during ozonation resulted in no observed intermediates; this was attributed to intermediates that were more accessible to aqueous ozone and were thus more rapidly degraded as they were formed.

d. Important parameters for PCB degradation were contact time, agitation, and pH. These operational parameters should be optimized, and they can be readily implemented for field remediation. Ultrasound was found to be effective in providing vigorous contact of dispersed PCB with dissolved ozone.

General Description of In-Situ Method and Apparatus

Another aspect of the present invention is an apparatus and method for the in-situ remediation of sediments containing PCBs or for treatment of sediments that are deposited underwater. The apparatus comprises an ozonator with a conveyor for conveying the ozonator across an underwater bed of the sediments along an axis. The ozonator comprises an inlet chute for nonmixingly scooping sediment and moving the sediment into and through the scoop, a treatment chamber to mix sediment with ozone to react the PCBs in the sediment with ozone. The mixed and PCB depleted sediment is then settled, compressed, redeposited on the underwater bed.

The conveyor can be any suitable system for conveying the ozonator apparatus as described. This can be implemented using any suitable marine platform. The implementation platform can be an adaptation of an existing dredging platform, where instead of a dredging or suction head, an ozonator apparatus of the invention is placed on the end of the dredging boom or ladder. This is a practical and economical alternative, as dredge plants already have the ability to move in a manner consistent with the invention's operation and also have power generators, hull space, and the auxiliary systems required for the invention. In this embodiment of the invention, any equipment that is required specifically for the present invention can be routinely added to an off-the-shelf dredging system.

The conveyor or dredge platform is used to move a "flow-through" in-situ ozonator through the top layers of bottom sediments. The depth passed through the ozonator could vary depending upon the application and limited only by the physical properties of the sediments as compared to the ability of the platform to push or pull the ozonator through the sediments. The "flow-through" design includes an inlet at a leading end, a treatment cell or reactor through which sediment passes while receiving treatment, and an outlet at a trailing end from which sediment is redeposited.

The cross-section of the ozonator can be any suitable shape, but is preferably adapted for its transit across the sediment bed, and to allow scooping and passage of the sediment through the ozonator by its forward motion. In a typical application, the bottom of the ozonator is essentially flat with a generally rectangular cross-section. Alternately, the ozonator has no bottom plate as long as the construction provides suitable inlet, reaction and settling functions. The construction should in any case provide structure to inhibit agitated sediment and the gas from escaping from the treatment chamber. In some applications, containment without a bottom plate may be sufficient, and the ozonator would include a bottom plate only for those applications where it is advantageous.

The ozonator in the preferred embodiment is attached to the end of a ladder of a dredging system where a dredging suction head is usually attached. The ozonator comprises an inlet chute for guiding sediment into the unit and moving the sediment through the inlet and into the ozonator as the unit moves through the top layer of the sediment bed. The movement of the ozonator is preferably the only force required to convey sediment from the bed into the inlet. Motorized rakes, belts, feeders, and like could potentially be used to help feed sediment into the ozonator, but in one aspect of the invention, it is preferably avoided to the extent possible to reduce excessive sediment suspension in the water column. The ozonator, including the inlet, is designed to provide containment, so that as the sediment is conveyed through the ozonator for mixing with a minimum of sediment escaping. The inlet chute can be constructed in any suitable configuration to guide sediment from its leading edge into the treatment chamber.

In an exemplary embodiment of the invention, the inlet chute is constructed with a bottom panel and generally vertical sidewalls. As the ozonator is conveyed over the sediment bed, the leading edges of the bottom panel and the side walls function to cut through the sediment and slice a top layer of the sediment into the inlet, of a width corresponding to the width of the bottom panel leading edge and the distance between the leading edges of the side walls. The sidewalls are higher than the maximum depth through which the inlet chute cuts or scoops. A top panel between the sidewalls contains any sediment suspended by the cutting action within the inlet chute. Many of the sediments that are subject to treatment by the present invention are semisolid, some with thixotropic properties, and will act like viscous liquids during treatment. Accordingly, it is clear that for these sediments the cutting and slicing action is simply dividing off a top layer of the sediment and the directing a flow of the thick liquid-like sediment through the ozonator.

The depth to which the inlet chute cuts depends upon several factors, including, for example, the depth of the contaminated sediment, the composition and properties of the sediment, size of the ozonator, and the speed, and power of the conveyor. Speeds will probably be on the order of a few feet/hour.

It should be noted that some contaminated sediments are tens of feet thick, such as in certain sections of the Fox River. It is not expected that the apparatus can be practically designed to treat such a sediment thickness in a single pass; however, an apparatus of the invention can be constructed to treat the top few feet to create a top layer of essentially PCB free sediment. This in effect will function similar to a capping operation, to contain or inhibit PCB migration into the water from underlying contaminated sediments by covering them with PCB depleted sediments. Additionally, the apparatus is designed to allow the mixing of external materials such as sand, gravel, nutrients, and binding agents to enhance the capping properties of the sediments. The present invention is expected to be less expensive to implement in most areas than traditional capping, as material and transport costs are completely avoided. Unlike capping, the post-treatment sediment bed should have nearly the same composition as before treatment, and any disruption of the ecology of the sediment is believed to be only temporary.

Relatively thin contaminated sediment layers, say 2 feet or less, can be treated and restored to state resembling its original decontaminated condition in a single pass. In this circumstance, the present invention can provide a permanent solution by removing the PCBs at a cost much less than removal or capping.

The transport length of the inlet chute is such to provide the scooping action described above, and isolate any suspended sediment that is produced in the ozonator from the ambient water; however, it is not anticipated that the inlet chute would need to be more than a few feet long. The ozonator, comprising inlet chute, as well as the following sections, and any other attached equipment, preferably has a bottom with minimal resistance to movement as it is conveyed by sliding or "floating" over underlying sediment. Accordingly, the bottom surface is preferably generally flat and smooth, with possibly to guide paths or grooves to ensure direct forward movement. In many cases, a bottom plate may not be necessary at all.

The treatment chamber mixes the sediment with ozone and possibly other treatment additives and provides contact time in order for the PCBs to react with the ozone and other additives. Ozone, produced by any suitable system, is conveyed into the mixing chamber where it is mixed with sediment as is enters the mixing chamber. The mixing can be provided by any suitable means. Possible mixing means include one or a combination of techniques such as rotating rakes or paddles, helical conveyor mixers, plow blades, harrow blades or wheels, gas sparging/rising systems, hydraulic mixing systems, ultrasonic transducers, and the like.

The purpose of the mixing is to contact the PCB contaminants with ozone. Any substantial mixing beyond that required for this function is preferably avoided. An object of the present invention is to avoid/minimize, as much as practical, turbidity from suspended sediments being ejected into the surrounding water. In addition, over-mixing can interfere with the settling process that follows.

The ozone reacts with PCBs in the sediment as it is mixed with sediment in the treatment chamber. The reaction produces products that are expected to be much less toxic that PCBs. Many of the products are water soluble and less recalcitrant than PCBs, and will degrade rapidly further by ozone or subsequently through biodegradation and other natural processes. Other byproducts, that may be insoluble, are much more amenable to biodegradation. Thus, the toxic effects of the products are believed to be much less than that of PCBs, and because of the higher degradability of these products, any toxic effects will not be nearly as intractable as PCB contaminants.

Other remediation measures may also be implemented. Additionally, various additives may also be added to assist further natural biodegradation, flocculate and settle the treated sediment, decrease turbidity, or in other ways assist in the remediation or improve the properties of the treated sediment. These additives can be added and mixed either in the treatment chamber or upon the sediments exit from the treatment chamber. Example additives that may facilitate the process include, flocculant aids (e.g., organic polymers and alum), bacterial inoculants, nutrient feeds for further biodegradation, pH modifiers, adsorbents for daughter/intermediate compounds of PCBs that may accommodate further natural biodegradation processes, and inert capping materials.

From the treatment chamber, the PCB depleted sediment is moved into a settling and outlet chamber. Mixing in the treatment chamber inevitably produces more of a liquid slurry than the original bottom sediment. If the sediment is redeposited in such a suspended or semisuspended form as it comes from the treatment chamber, it may be subject to erosion and transport by ambient water currents. The settling and outlet chamber returns the treated sediments, as nearly as possible, back to their original state and redeposit them onto the sediment bed. Settling and compression in a sediment depositing chamber of the treated sediment is required to reach this more stable condition. The compression may comprise one or more of suitable densification systems such as gravity systems, filtration systems, filter presses, belts, pneumatic drums, hydraulic pressure, or vacuum systems. A suitable system is continuous or pseudo-continuous so that input and output can proceed uninterrupted. Pseudo-continuous process would involve of one or more batch processes that are operated in a sequential manner. The compression processes, whether continuous or pseudo-continuous, are scaled to densify a preferably continuous flow of mixed sediment from the treatment chamber, as the ozonator is conveyed continuously over the sediment bed. In an alternate, but less preferred system, the conveyance is operated in a pseudo-continuous manner where the ozonator is temporality interrupted to allow the sediment to be settled or compressed in a batch matter, after which the conveyance is started to convey more sediment through the ozonator and into the sediment depositing chamber. This process is repeated until the entire path of the ozonator over the sediment bed is completed.

Compression, consolidation, and densification are used here to mean the dewatering of the sediment to the extent that it returns to a semisolid state similar to the original untreated sediment.

The transit length of the sediment depositing chamber is such to allow sufficient densification to return the sediment to near its pretreatment condition. Because of the semisolid nature of and the fine particle size of many sediments, gravity settling alone will probably not be sufficient for these sediments using a chamber of reasonable length and size. In these instances, a preferred system involves a filtering system alone or combined with a long "tail" for gravity settling.

In certain systems, the sediment depositing chamber will comprise the major portion of the length of the ozonator. The total length of the ozonator will depend greatly upon the conveying system. An ozonator unit equal to or shorter than the length of the ladder and hull of the supporting dredge platform, as illustrated in FIG. 5, would reduce operational conflicts, but the ozonator may be longer or shorter, depending upon design factors.

A function of the sediment depositing chamber is to decrease turbidity by reducing suspended sediment and by increasing the density (i.e. decreasing the water content) of the sediment. The density of the redeposited sediment may be nearly the same as, or more or less, depended upon the apparatus design, than the density of the untreated sediment. The object is to reduce suspension of the sediment, and any density is suitable. In any case, overtime the redeposited sediment will reach equilibrium with water and probably return to its previous density.

Figure 5:
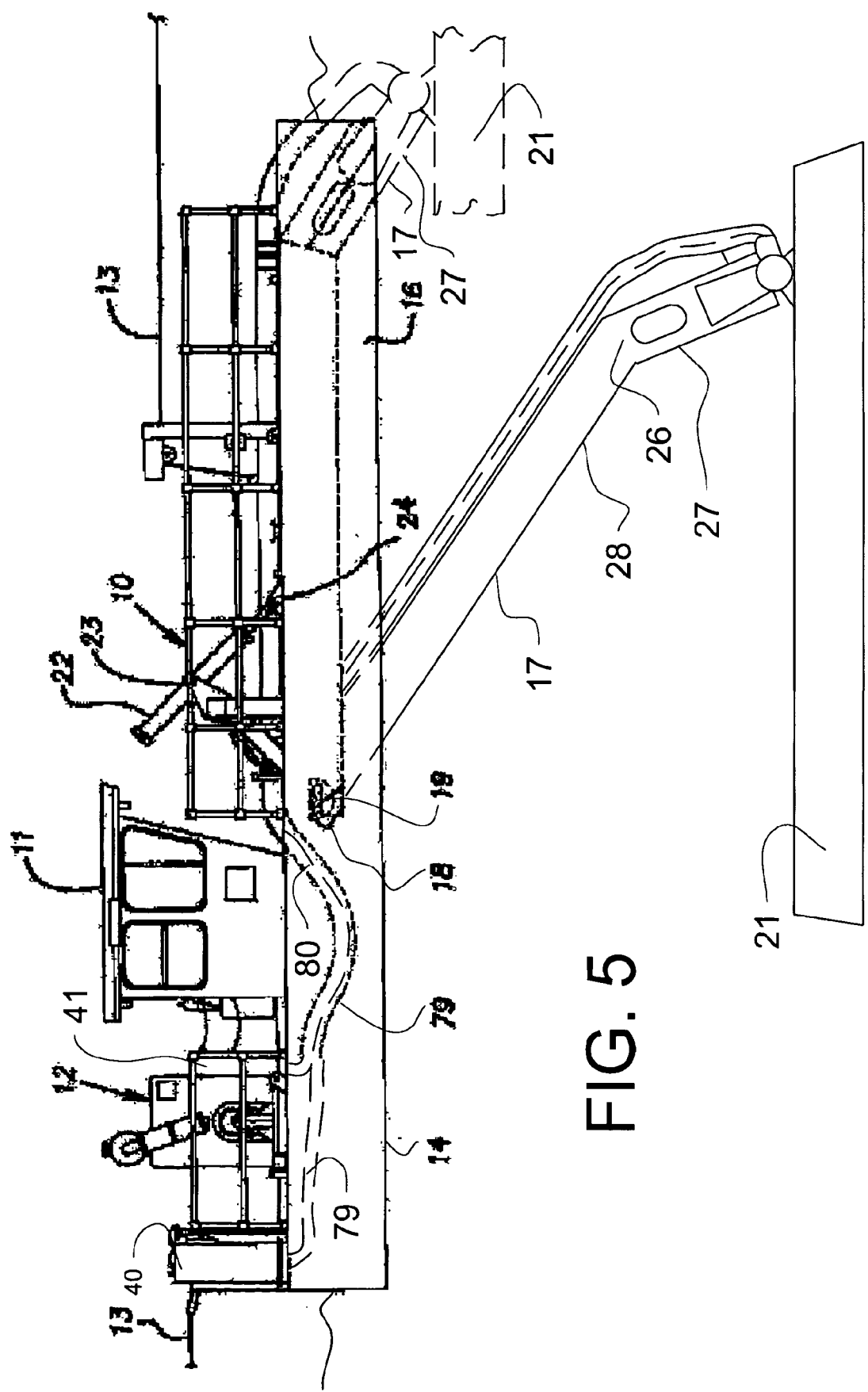
FIG. 5 is a schematic side view of an exemplary in-situ treatment apparatus of the invention.

Reference is now made to FIG. 5, which is a schematic side view of an exemplary apparatus of the invention. The conveyor comprises essentially a dredge barge or hull modified for the present invention. An example of a dredge system that can be modified is disclosed in U.S. Pat. No. 6,318,005, which is hereby incorporated by reference. A dredge barge 10 of generally known construction has a lever room or cabin 111 and an engine or power plant 12 for driving a ozone generator, compressor, a hydraulic pump for operating various hydraulic motors and actuators on the barge, and various other equipment that requires power. To provide the conveyance of the system, traverse cable 13 extends fore and aft of the barge 10 for pulling the barge forwardly or rearwardly via a hydraulic barge mounted winch as is known in the art. Other conveyance systems are also contemplated. A hull 14 of the barge 10 includes a pair of pontoons 16 that straddle a dredge ladder or boom 17. The ladder 17 is shown in phantom with partial ozonator in a relatively shallow operating position in FIG. 5 and in a relatively deep operating position in solid lines with in FIG. 5. The ladder can be raised above the solid line position of FIG. 5 to a point where it is entirely above the bottom of the hull 14.

The barge 10 also contains auxiliary equipment for operation of the ozonator, including an ozone generator 40, and other auxiliaries 41 to support the mixing and settling systems. Auxiliaries 41 may include, for example, auxiliary generators, air compressors, hydraulic pumps for hydraulic motor drives, water pumps, additive supply tanks and pumps, etc. An ozone supply line 79, and line 80 or lines for the other auxiliaries as needed are passed down the ladder 17 to the ozonator 21.

One end 18 of the ladder 17 is pivotally supported on the hull with trunnions 19. An opposite end of the ladder carries an ozonator 21. The angular position of the ladder 17 and, consequently, the depth of the ozonator 21 are controlled by a hydraulic piston and cylinder actuator 22. The actuator 22 is carried on trunnions fixed to the deck of the barge and is coupled by a device to a bracket 24 fixed to the ladder 17.

The major length of the ladder 17, in the illustrated construction, is fabricated from any suitable material, such as a cylindrical steel tube that is mitered at a plane or joint 26 such that a lower relatively short section 27 of the ladder drops down in a vertical plane at an obtuse angle with respect to an upper longer section 28.

Figure 6:
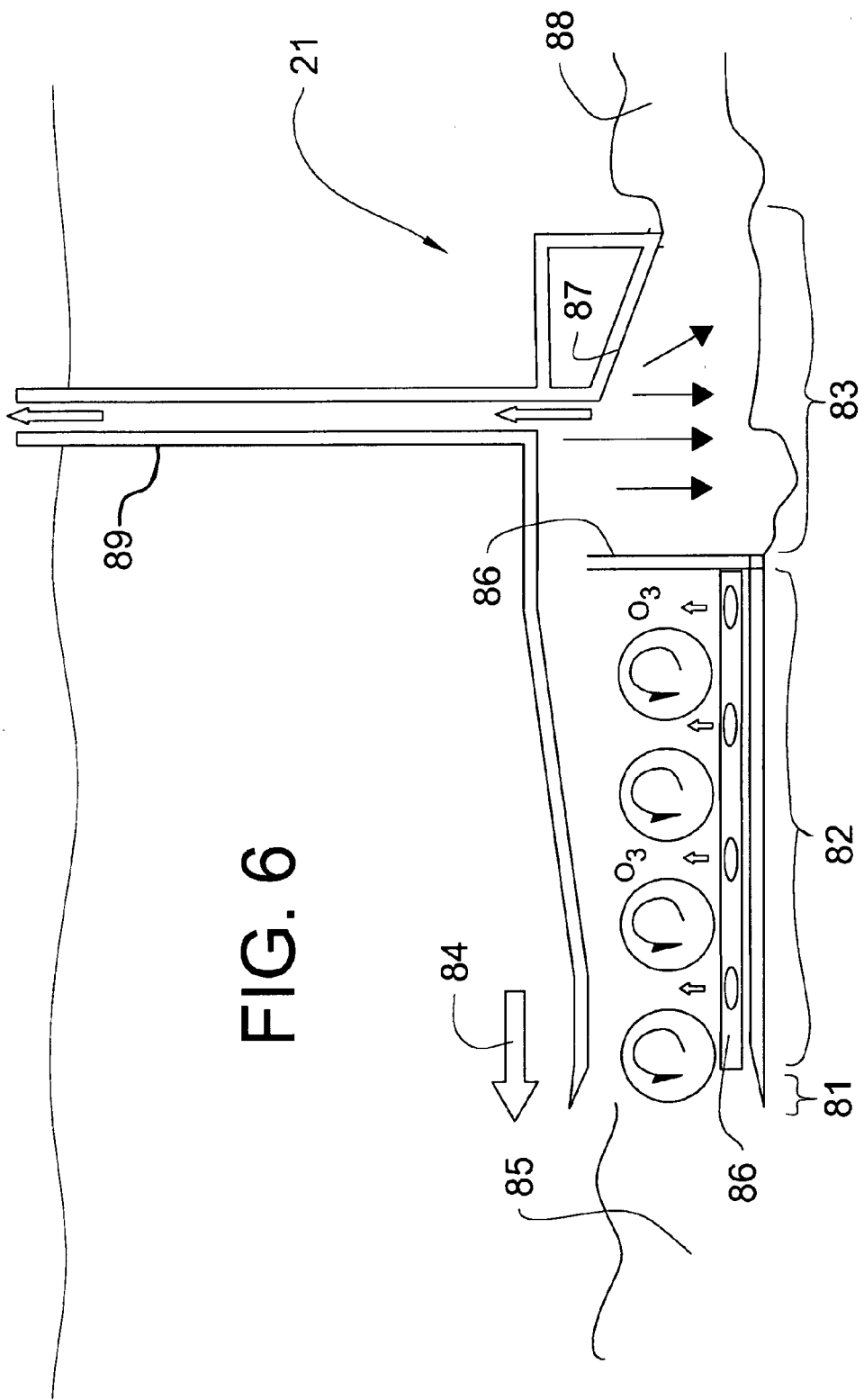
FIG. 6 is a schematic cross-sectional side view of an exemplary ozonator of the invention for in-situ treatment of sediments.

Reference is now made to FIG. 6, which is a schematic cross-sectional view of an ozonator 21. The ozonator has an inlet chute 81, a treatment chamber 82, and a sediment depositing chamber 83. The ozonator 21 travels in the direction indicated by the arrow 84 so that the inlet chute 81 scoops up an upper layer of PCB contaminated sediment 85. The sediment passes into and through the inlet chute 81 into the treatment chamber 82. In the treatment chamber, ozone-containing gas is sparged through suitable feeds 86 into the sediment to mix the ozone with the sediment. After passing through the treatment chamber, the mixed sediment passes over a weir where the sediment is settled or compressed by gravity settling and passing under the converging roof panel 87. The settled, PCB-depleted sediment 88 is left behind the ozonator 21 as it travels forward. Gases, which include excess unreacted ozone, unreacted gases that were introduced with the ozone, such as nitrogen and oxygen, gases produced by chemical reactions, and any gases from the auxiliary equipment and other sources, are vented through vent 89 to a point above the water line 90 and are treated, if such is required.

Reference is now made to FIG. 7A and FIG. 7B, which are respectively cross-sectional side and top view of another exemplary ozonator 21 according to the invention. It is constructed in a generally tunnel-like or tubular configuration, with a bottom wall 152, top wall 151 and side walls 153, to contain suspended sediment and provide a platform for the various components of the system. Optionally, the bottom wall 152 can be deleted, as the top and sidewalls 151, 153 may provide sufficient containment. The ozonator is conveyed or moved to the left by means of ladder 17, which is connected to a hull and conveyor system as in FIG. 7A.

Sediment 101 contaminated with PCB (sediment is not shown in FIG. 7B for clarity) is scooped from a sediment bed 191 into inlet chute 103 by the forward motion of the ozonator and separated by the leading edges 154 of the bottom and sidewalls, 152, 153. The sediment is then mixed in a treatment chamber 105 by any suitable mixing system to contact the ozone with the contaminants in the sediment. Shown in the figure is a mechanical paddle mechanism 107, and an ultrasound transducer 195. Ozone introduced or sparged through inlet pipes 109 is mixed into the mixing sediment to contact and react with the PCBs in the sediment. The paddle is driven by any appropriate motive system 113 such as electrical, hydraulic or pneumatic. Ozone supply lines 111, and power (electrical, compressed air, or pneumatic) line(s) 115 for the motive system are directed along the ladder or boom 17 to the dredge hull where they are connected to appropriate auxiliaries 41 in the hull 10 (FIG. 5).

The treated and mixed sediment 121 is densified or compressed by a filtering system. In the figures, various systems are shown for illustrative purposes, but it is understood that different or similar settling/densifying/compressing systems may be used singly or together in any order. The first system comprises a rotating roll or drum 123 with a circumference of a filter media. A vacuum is draw in the interior of the drum through vacuum line 125, which travels up the boom to a vacuum pump auxiliary with the other auxiliary and ozone supply lines 111, 115. The vacuum draws water through the media leaving compressed and dewatered sediment on its surface, which is scraped off by a scraper 127.

The second compressing system illustrated comprises a driven belt 131 of a filter media that draws the sediment along converging path or channel to squeeze sediment against the filter media, thus dewatering and compressing the sediment. In these figures, the convergence is provided by a second belt 132 of similar construction, but may be provided by, for example, a stationary and converging panel, or filter screen.

The filter drum 123, the belts 131, 132, or any other filtering, or dewatering, compressing, densification, or mixing system that requires motive power to operate is driven by appropriate motive systems, with supply line(s) passing between the motive system and the hull along the boom 17. While not required, the mixing or the compression devices can be designed to assist movement of the sediment through the ozonator. For example, the mixing system comprises paddles or an auger conveyor. In addition, separate structures can be used to assist in moving the sediment through the ozonator.

Gases are vented through vent 141. These gases are any gases produced by chemical reaction, by the mixing, deaeration of the water sediment, unreacted ozone and other unreacted gases introduced with the ozone, gases introduced for pneumatic motive systems, and gases from any other source. The gases travel from the vent 141 through gas vent line 142, which travels along boom 17 to the auxiliaries 41 (FIG. 5) for appropriate treatment before being expelled into the atmosphere.

The settled and PCB depleted sediment 161 leaves through the outlet 162 or trailing edge of the ozonator and is redeposited on the sediment bed 191.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

For example, there are many marine platforms, including mobile, moored, fixed, floating and submerged, that can provide an appropriate conveyor system for an ozonator. While an adapted dredging barge system in advantageous for cost reasons, because of its straightforward engineering and availability, local conditions may dictate other configurations. For example, a submarine sledge drug by a cable attached to land-based mooring, or an integrated ozonator and conveyor systems that can travel submerged or semi-submerged along the sediment bed can be used. This flexibility in construction is due the fact that the present invention does not require the transfer a large amount of material to or from the treatment site, which is a different than both removal and capping systems. The materials and components for ozone and auxiliaries that are transferred can be produced at or near the ozonator or are required only in small amounts.

In addition, it is contemplated that the method of the invention can be used to remediate contaminated sediments containing not only PCBs, but polyaromatic hydrocarbons (PAH), various chlorinated hydrocarbons, organochlorine pesticides (such as dichlorodiphenyltrichloroethane (DDT)), and other recalcitrant or persistent contaminants. The reaction of ozone with certain compounds is documented in Yu Zeng, P. K. Andrew Hong, "Slurry Phase Ozonation for Remediation of Sediments Contaminated by Polycyclic Aromatic Compounds," *Journal of the Air & Waste Management Association*, Vol 52, pp. 174–185, January 2002, which is incorporated by reference.

The present invention is based in part by the discovery that PCBs in contaminated sediments can be reacted with ozone, to form products that are more reactive for further reaction with ozone, or for eventual biodegradation. Since these products are reactive and treatable by biodegradation techniques, sediments with PCBs can be remediated much quicker that for previous methods that rely principally on bioremediation.

In addition, these sediments containing the above contaminants can be treated with ozone in-situ, as described above, or ex-situ, by suitable systems. As an example of ex-situ treatment is a method involving ex-situ treatment done by ozonation of soil slurry in a continuously stirred, batch or flow, reactor until the contaminants (e.g. PCB) and daughter compounds are completely gone, or until the toxicity is decreased sufficiently that biological degradation (with or without nutrient supplements) can take over. Accordingly, contemplated is an integrated process involving both ozone treatment and biological degradation. An integrated system can be done with two serial CSTR-type reactors, where the first one is supplied with ozone only and the second reactor with oxygen, microbial seeds, and nutrients as necessary. It could also be a plug-flow like reactor, if the slurry can be moved along a long channel. Further, it could be a batch that is bubbled with ozone in the first stage, followed by microbial inoculation and supplies of oxygen (and supplemental nutrients as necessary). The use of biological process in the second stage is purely for economical reason; it is typically more economical if biodegradable compounds are dealt with by microbes rather than by ozone all the way.

TABLE 1

Summary of PCB degradation under different conditions.

| | Degradation | Treatment | Contact time (hr) | pH | Cosolvent | Ultrasound | Mechanical stir | Temperature (° C.) |
|---|---|---|---|---|---|---|---|---|
| Arochlor 1242 | negligible | air | 1 | 7.5 | — | no | yes | 25 |
| | negligible | air | 1 | 7.5 | — | probe | yes | 25 |
| | 10–12% | ozone | 2 | 7.5 | — | no | yes | 25 |
| | 27–47% | ozone | 0.5 | 7.5 | — | probe | yes | 25 |
| | 72–98% | ozone | 1 | 7.5 | — | probe | yes | 25 |
| | negligible | air | 1 | 7.5 | — | tank | no | 25–35 |
| | 52–85% | ozone | 1.5 | 7.5 | — | tank | no | 25–35 |
| | 52–96% | ozone | 3 | 7.5 | — | tank | no | 25–35 |
| | 38–65% | ozone | 2 | NC* | — | tank | no | 25–35 |
| | 90–100% | ozone | 1 | NA | — | no | no | 25 |
| Arochlor 1254 | negligible | air | 1 | 7.5 | — | probe | yes | 25 |
| | 5–10% | ozone | 2 | 7.5 | — | no | yes | 25 |
| | 10–30% | ozone | 0.5 | 9 | — | probe | yes | 25 |
| | 15–31% | ozone | 1 | 9 | — | probe | yes | 25 |
| | 30–45% | ozone | 1 | 7.5 | — | probe | yes | 25 |
| | 30–50% | ozone | 3 | 7.5 | — | probe | yes | 25 |
| | 45–70% | ozone | 1 | 7.5 | acetone (1%) | probe | yes | 25 |
| | 43–58% | ozone | 0.5 | 7.5 | acetone (1%) | probe | yes | 25 |
| | negligible | air | 1 | 7.5 | methanol (1%) | probe | yes | 25 |
| | 53–65% | ozone | 1 | 7.5 | methanol (1%) | probe (10%) | yes | 25 |
| | 50–80% | ozone | 1 | 7.5 | methanol (1%) | probe | yes | 25 |
| | 52–100% | ozone | 3 | 7.5 | methanol (1%) | probe (10%) | yes | 25 |
| | 50–97% | ozone | 1 | 7.5 | methanol (1%) | no | yes | 25 |
| | 85–100% | ozone | 1 | NA | chloroform (100%) | no | no | 25 |
| Arochlor 1232 | 10–13% | air | 2 | NA | hexane (100%) | no | no | <12 |
| | 23–50% | ozone | 2 | NA | hexane (100%) | no | no | <12 |
| | 36–55% | ozone | 2 | NA | — | no | yes | 12 |

TABLE 1-continued

Summary of PCB degradation under different conditions.

|  | Degradation | Treatment | Contact time (hr) | pH | Cosolvent | Ultrasound | Mechanical stir | Temperature (° C.) |
|---|---|---|---|---|---|---|---|---|
| Sediment | as reference level | air | 2 | 7.5 | — | no | yes | 20 |
|  | negligible | ozone | 2 | NA | — | no | yes | 15 |
|  | negligible | air | 2 | NA | — | no | yes | 15 |
|  | negligible | air | 2 | 7.5 | — | probe | yes | 25 |
|  | 10–50% | ozone | 2 | 7.5 | — | no | yes | 20 |
|  | 45–82% | ozone | 2 | 7.5 | — | tank | no | 25 |
|  | 33–50% | ozone | 1 | 7.5 | — | probe | yes | 25 |
|  | 65–83% | ozone | 3 | 7.5 | — | probe | yes | 25 |

Note:
probe - use of ultrasound probe at full power (600-Watt);
tank - use of ultrasound tank (60-Watt)
NC* - pH not controlled; dropped to pH <2.5 within 10 minutes;
NA—not appropriate

What is claimed is:

1. An apparatus for in-situ remediation of sediments containing contaminants that are deposited in an underwater sediment bed, the apparatus comprising:
 a conveyor;
 an in-situ ozonator, the in-situ ozonator comprising:
  an inlet for directing sediment from the underwater sediment bed and for moving the sediment into the in-situ ozonator;
  a treatment chamber disposed to receive sediment passing from the inlet;
  a sediment depositing chamber;
  the treatment chamber of the in-situ ozonator comprising:
   an ozone injector for injecting ozone into the treatment chamber;
   a mixer for mixing the sediment and ozone sufficient to react the ozone and contaminants contained in the sediment;
  the sediment depositing chamber of the in-situ ozonator disposed to receive treated and mixed sediment from the treatment chamber, and including a structure to settle or compress the sediment and redeposit the sediment on the underwater sediment bed;
  the conveyor operatively associated with the in-situ ozonator to convey the in-situ ozonator through the underwater sediment bed, such that the sediment is directed into and moved through the in-situ ozonator through the conveying of the in-situ ozonator by the conveyor.

2. The apparatus of claim 1, wherein the conveyor comprises a floating hull and a boom and a motive system to convey the conveyor through water, where the boom is operatively attached to the in-situ ozonator.

3. An in-situ ozonator apparatus for in-situ remediation of an underwater sediment bed containing contaminants that is conveyed through the underwater sediment bed, the in-situ ozonator apparatus comprising:
 an inlet for directing sediment from the underwater sediment bed and for moving the sediment into the apparatus;
 a treatment chamber disposed to receive sediment passing from the inlet;
 a sediment depositing chamber;
 the treatment chamber comprising:
  an ozone injector for injecting ozone into the treatment chamber;
  a mixer for mixing the sediment and ozone sufficient to react the ozone and contaminants contained in the sediment;
 the sediment depositing chamber of the in-situ ozonator disposed to receive treated and mixed sediment from the treatment chamber, and including a structure to settle or compress the sediment and redeposit the sediment on the underwater sediment bed;
 the apparatus constructed to be conveyed through the underwater sediment bed with sediment being directed into and moved through the apparatus through the conveying of the apparatus.

4. The in-situ ozonator apparatus of claim 3, wherein the sediment is also conveyed through the in-situ ozonator by the mixer or the structure to compress the sediment, or by a separate sediment conveying structure.

5. The in-situ ozonator apparatus of claim 3, wherein the mixer includes one or more of rotating rakes or paddles, helical conveyor mixers, plow blades, harrow blades or wheels, gas sparging/rising systems, hydraulic mixing systems, and ultrasound mixing systems.

6. The in-situ ozonator apparatus of claim 3, wherein the structure to compress the sediment includes one or more of gravity systems, filtration systems, filter presses, belts, pneumatic drums, hydraulic pressure, or vacuum systems.

7. The in-situ ozonator apparatus of claim 3, wherein the contaminants include chlorinated hydrocarbons or polyaromatic hydrocarbons (PAHs).

8. The in-situ ozonator apparatus of claim 3, wherein the contaminants include polychlorinated biphenyls (PCBs).

9. The in-situ ozonator apparatus of claim 3, wherein the contaminants include dichlorodiphenyltrichloroethane (DDT).

* * * * *